Jan. 18, 1944.  D. B. CLARK ET AL  2,339,377
MOTION PICTURE SLATING DEVICE
Filed March 30, 1940  2 Sheets-Sheet 1

INVENTORS.
Daniel B. Clark
Robert C. Stevens.
BY
ATTORNEY.

Jan. 18, 1944.     D. B. CLARK ET AL     2,339,377
MOTION PICTURE SLATING DEVICE
Filed March 30, 1940     2 Sheets-Sheet 2

INVENTORS.
Daniel B. Clark
Robert C. Stevens.
BY
ATTORNEY.

Patented Jan. 18, 1944

2,339,377

UNITED STATES PATENT OFFICE 2,339,377

MOTION PICTURE SLATING DEVICE

Daniel Bryan Clark and Robert Colby Stevens, Los Angeles, Calif., assignors to Twentieth Century-Fox Film Corporation, Los Angeles, Calif., a corporation of New York Application March 30, 1940, Serial No. 327,054

5 Claims. (Cl. 88—16)

This invention relates to the art of cinematography and deals with a slating device for identifying films. The present invention refers to a copending application, Serial Number 314,058, filed January 16, 1940, entitled Slating device, subsequently issued on April 22, 1941 as Patent Number 2,239,380, which deals with a construction for the same purpose that was developed prior to the construction disclosed herein.

In the motion picture industry it is customary to identify each "take" by means of indicia photographed directly upon the film. In studio practice the general method of doing this consists in holding before the lens of the camera, either before or after each take, a board or slate carrying the indicia to be photographed. This procedure is termed "slating." In order to make the photographed image of the indicia large enough to be legible, it is necessary that the letters and numerals on the slate be quite large, thus necessitating a fairly large board or slate that must be held at some distance from the camera to get the proper focus. The expression "take" is used to signify an actual photographing of a scene. The common practice of holding a slate before the lens of a camera to identify takes is objectionable, in that after a scene is rehearsed and set with the principals in place they must be disturbed by the introduction of a slate or board held in photographing position in front of the camera. In addition to the confusion caused by this procedure, there is also a time delay necessitated by the rearranging of the subjects after the slating has been completed. Our invention, as before stated, is an extension of the idea of slating motion picture film by means within the camera itself and deals with another means for the same purpose as shown and described in the above mentioned patent.

The principal purpose of our invention is to provide a means that may be mounted upon a motion picture camera and operated by the camera operator to photograph directly upon the film running through the camera indicia which identifies that particular part of the film. Another object of our invention is the provision of a device for slating film which may be mounted upon a camera in such a manner that the slating indicia is photographed upon the film in the camera through the camera photographing lens and the usual shutter arrangement. A further object of our invention is to provide a slating means that may be mounted externally of the camera case and swung into a photographing position in front of the camera lens. Another object is to provide an auxiliary optical system that may be used in conjunction with the regular camera lens to photograph comparatively small indicia in close proximity to the camera lens. Still another object of the invention is to provide a slating device that may be used in conjunction with photographing lenses of different focal lengths without adjustment. Another object is to provide a slating device that may be operably mounted upon the sunshade bracket. Other objects and advantages, such as the simplicity and the easy operation of the device, together with its convenient location and construction, will become apparent as the description proceeds in conjunction with the drawings in which:

Briefly stated, our invention consists of an optical system having illumination and slating indicia associated therewith with means for swingingly mounting the entire unit upon the sunshade bracket so that the whole device may be swung into and out of a photographing position in front of the camera lens.

Figures 1, 3, 4:
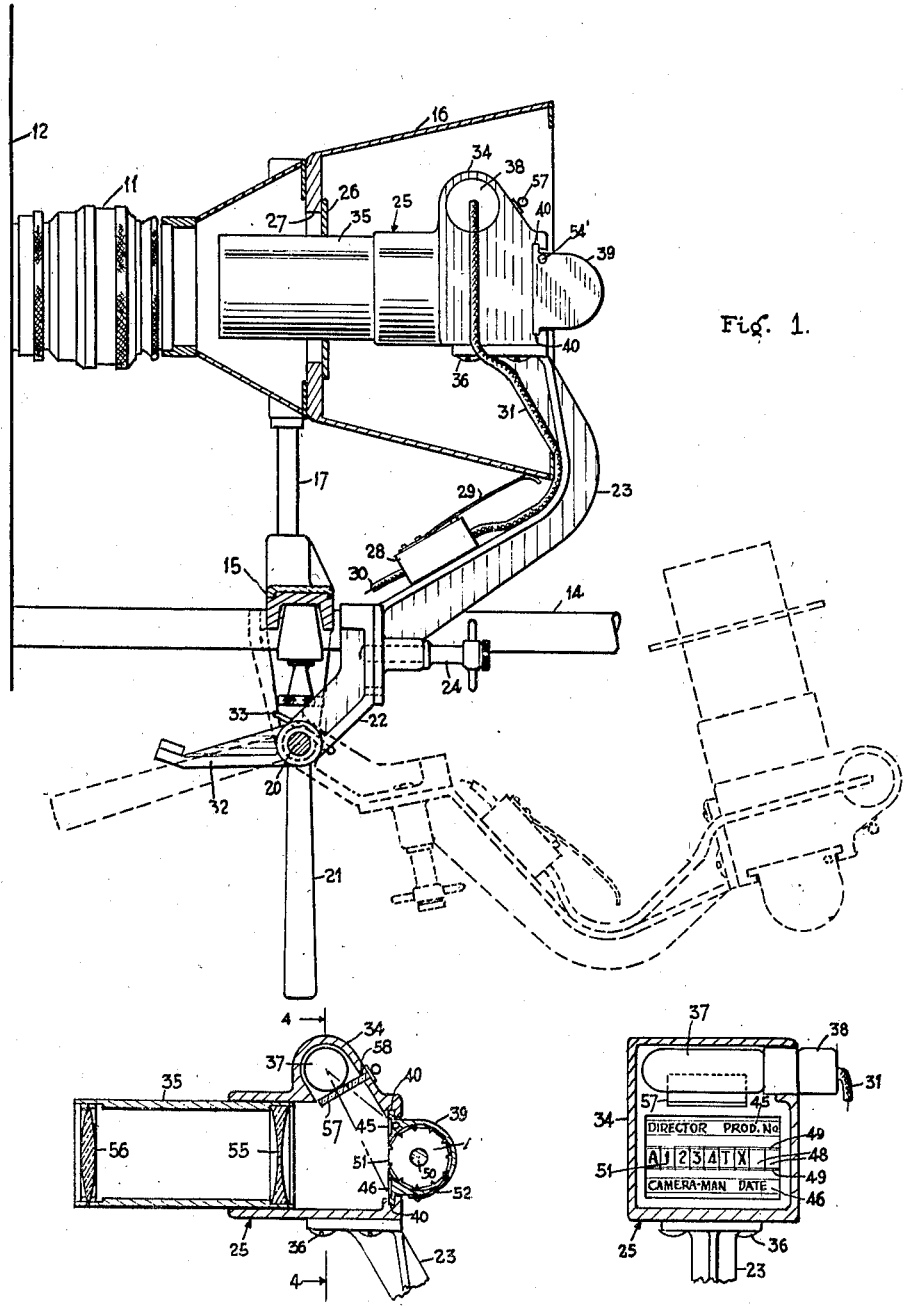
Figure 1 is a side elevation partly in section showing how our slating device may be mounted upon the sunshade bracket of a standard motion picture camera.
Figure 3 is a longitudinal section of the principal part of our slating device showing the optical system and its attendant parts.
Figure 4 is a section on line 4—4 of Figure 3.
Figure 2:
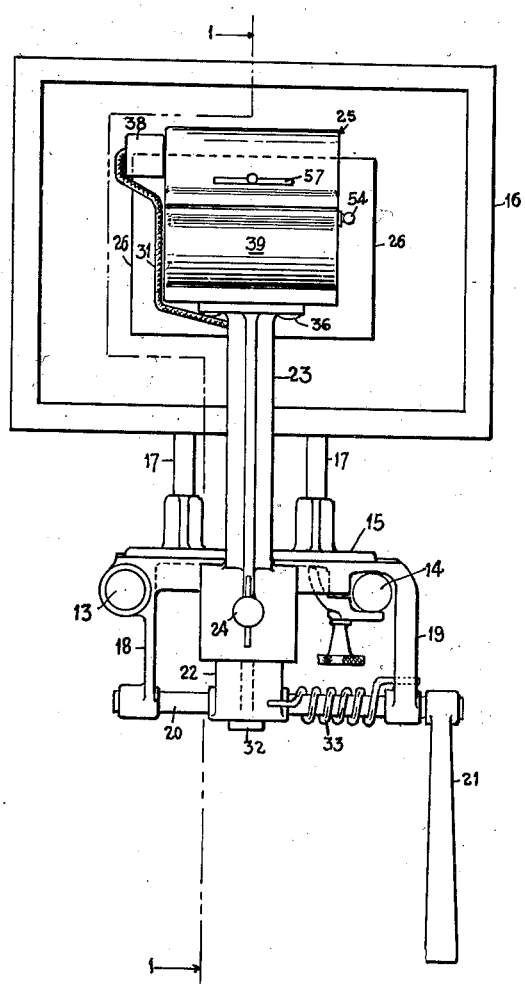
Figure 2 is a front elevation of the same.

In Figures 1 and 2 we have shown how our device may be mounted upon a standard motion picture camea. Here it will be observed that we have illustrated parts of a motion picture camera, consisting of a lens generally designated 11 mounted upon a part of a camera 12, which may be the lens turret. No detail of this construction is shown since it is deemed sufficient to show a standard lens mount suitably mounted upon a camera. The camera 12 carries the usual extending bars 13 and 14 upon which is mounted a bracket generally designated 15 that in turn supports a sunshade 16 upon rods 17. The foregoing parts are standard camera construction.

For the purpose of mounting our slating device we alter the bracket 15 by extending depending arms 18 and 19 from the bracket and rotatably mount in the arms a rod 20 carrying a handle 21 on one end thereof. Fixedly attached to the rod 20 is an arm 22 which in turn is adapted to detachably support a curved arm 23. The arm 23 may be mounted upon the arm 22 in any suitable manner such as by means of a thumb bolt 24. Upon the upper end of the arm 23 we mount our optical system generally designated 25. As can be seen, the optical system 25 may be swung upwardly from an out-of-the-way position shown by dotted lines into the photographing position shown in solid lines. This may be done by rotating the handle 21. When the device is in the position shown by solid lines, a mask 26 is arranged to come into position to close the opening 27 through the rear of the sunshade and the optical system is brought into alignment with the photographing lens 11 of the camera. It will be noted that the arm 23 carries a switch 28 which has an extending finger 29 adapted to engage the lower part of the sunshade 16 when the optical system is in the photographing position shown in full lines. The switch in this position will close a circuit between conductor 30, which leads to a source of electrical energy not shown, and conductor 31, which leads to an illuminating source in the optical system 25. The arm 22 is formed with an opposite arm 32 which acts as a stop against the bracket 15 to control the dotted line position of the optical system when not in use. Also a spring 33 may be incorporated, as shown in these views, to counterbalance the weight of the system.

The optical system 25 has been so designed that the projected rays are parallel. In Figures 3 and 4 it can be seen that the optical system comprises a casing 34 into which a lens barrel 35 is adapted to be adjustably fitted. The casing 34 is mounted upon the arm 23 in any suitable manner, such as by screws 36. In the upper part of the casing we provide a light source 37 and supply electrical current to the source by means of the before mentioned conductor 31 which may terminate in a plug 38. On the rear end of the casing 34 we slidably mount an indicia carrying member 39 which is more fully illustrated in Figures 5 and 6. As is shown in Figures 1 and 3, the member 39 is adapted to be slidably mounted in grooves 40 upon the casing 34.

Figures 5, 6:
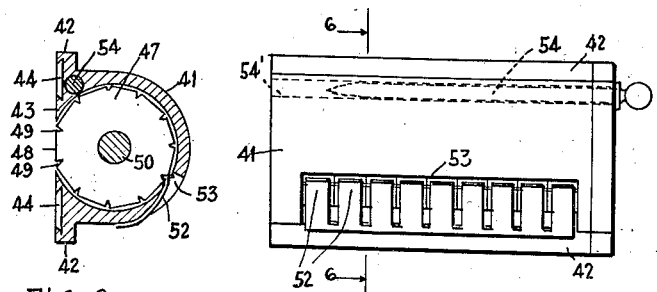
Figure 5 is an enlarged rear view of the member carrying the numerals and the slating indicia.
Figure 6 is a section of Figure 5 on line 6—6.

Referring to Figures 5 and 6 for more detailed construction of the member 39, it will be observed that this member consists of a casing 41 formed with ears 42 adapted to fit in the grooves 40. The casing 41 is formed with a flat face 43, having dovetailed slots 44 therein for the purpose of slidably mounting slips 45 and 46 (see Figure 4) carrying the desired indicia. The casing 41 also carries a counter arrangement consisting of a plurality of wheels 47. The wheels 47 are formed with a plurality of flat faces 48 separated by slots 49 and are rotatably mounted upon a shaft 50, said shaft being mounted in the casing 41. The flat faces on the wheels may carry numbers or letters as indicated at 51 in Figure 4, or any other desired indicia. A detent arrangement for aligning the flat faces on the wheels comprises a plurality of spring fingers 52 suitably mounted upon the casing, such as by soldering, extending through a slot 53 on the back of the casing in such a manner that the separate fingers of the detent arrangement engage notches on respective wheels and align the flat faces of the wheels as shown at 51 in Figure 4. The wheels 47 may be turned to expose the desired indicia by engaging the upper notch 49 with any suitable means, such as a pointed pick 54 conveniently carried in a hole 54', and pulling the upper notch down to the position of the lower notch 49, whereupon the detent finger 52 engages a succeeding notch on the rear of the wheel and accurately aligns the indicia.

The lenses employed for projecting the indicia 51 on the wheels and the slips 45 and 46 consist of a concave lens 55 and a spaced convex lens 56 mounted in the lens barrel 35. In conjunction with the light 37 we may incorporate a diffusion glass 57 which may be inserted between the light and the indicia through a slot 58 in the casing 34. The lenses 55 and 56 are arranged so that when the camera lens 11 is set on infinity an image of the indicia will be focused directly upon the film and the position of the optical system 25 with respect to distance from the lens 11 is not critical.

In operation the optical system will be carried in the dotted line position when not in use but whenever a film is to be slated before a take the operator grasps the handle 21, which is conveniently located for this purpose, and before the camera starts turning swings the optical system up into the position shown by full lines. In this position, the finger 29 engages the bottom of the sunshade 16 and closes the circuit between conductors 30 and 31, thus furnishing current to the lamp 37 which illuminates the indicia. After the camera has run sufficient footage through the aperture and photographed the indicia, the optical system is rotated back into the dotted line position and the slate is made without disturbance or confusion. Without interruption the camera is kept running and the take is made. The indicia may be photographed upon the film either before the take or after the take if desired. The device is simple, inexpensive, self-contained and yields accurate results.

We claim:

1. In combination with a motion picture camera having a sunshade supported upon a bracket, a slating device, means for pivotally mounting said slating device upon said bracket, said means including depending arms on said bracket, a shaft supported in said depending arm, and an arm pivotally mounted on said shaft adapted to swing said slating device into optical alignment with the lens of said camera.

2. In combination with a motion picture camera having a sunshade supported upon a bracket, a slating device comprising a casing having therein indicia and means for optically projecting said indicia, an arm pivotally mounted on said bracket adapted to carry said casing on its free end and swing the same up and into a photographing position within said sunshade in front of the camera lens, and a mask on said casing adapted to cooperate with a member in said sunshade having an aperture therein optically aligned with said lens to close off stray light to said lens when said casing is in a photographing position.

3. In combination with a motion picture camera having a sunshade supported on a bracket, a slating device comprising a casing having therein indicia and means for optically projecting said indicia, means for swinging said casing from an out-of-the-way position to a position in front of the camera lens whereby said indicia are projected through said camera lens, said means including an arm swingably mounted on said bracket and having said casing mounted on the outer end thereof, and a mask on said casing adapted to cooperate with a member in said sunshade having an aperture therein optically aligned with said lens to close off stray light to said lens when said casing is in a position to project said indicia through said lens.

4. In combination with a motion picture camera having a sunshade supported upon a bracket, a slating device comprising a casing, means for mounting slating indicia in said casing, an optical system in said casing for projecting said indicia, a source of illumination within said casing for illuminating said indicia, an arm pivotally mounted on said bracket adapted to carry said casing on its free end and swing the same upward and into a photographing position within said sunshade in front of the camera lens, and a mask on said casing adapted to cooperate with a member within said sunshade having an aperture therein optically aligned with said camera lens to close off stray light to said lens when said casing is in a photographing position.

5. In combination with a motion picture camera having a sunshade supported upon a bracket, a slating device having an optical system, detachably mounted indicia and a source of illumination therein, means for swingably mounting said slating device upon said bracket so that it may be swung upward and into optical alignment with the camera lens within said sunshade and a mask carried by said slating device adapted to cooperate with a member within said sunshade having an aperture therein optically aligned with said camera lens for cutting off stray light to said lens when said device is in optical alignment with said lens.

DANIEL BRYAN CLARK.
ROBERT COLBY STEVENS.